(12) United States Patent
Shiwaku et al.

(10) Patent No.: US 7,558,645 B2
(45) Date of Patent: Jul. 7, 2009

(54) OVERHEAD TRAVELLING CARRIAGE SYSTEM

(75) Inventors: Tamotsu Shiwaku, Kani (JP); Takashi Nakao, Neyagawa (JP); Isao Fukuda, Kameoka (JP); Kazuro Ueshima, Kyoto (JP)

(73) Assignee: Murato Kikai Kabushiki Kaisha, Kyoto-shi (JP)

( * ) Notice: Subject to any disclaimer, the term of this patent is extended or adjusted under 35 U.S.C. 154(b) by 651 days.

(21) Appl. No.: 11/245,013

(22) Filed: Oct. 7, 2005

(65) Prior Publication Data

US 2006/0161304 A1    Jul. 20, 2006

(30) Foreign Application Priority Data

Jan. 17, 2005    (JP) ............................. 2005-008627

(51) Int. Cl.
    *G06F 19/00*    (2006.01)
(52) U.S. Cl. .................. 700/245; 700/264; 212/71; 212/274; 212/278; 212/331; 212/332; 414/217; 414/249; 451/5
(58) Field of Classification Search ................ 700/245, 700/264; 212/71, 274, 331, 332, 278; 414/217, 414/219, 24; 451/5
    See application file for complete search history.

(56) References Cited

U.S. PATENT DOCUMENTS 3,593,869 A * 7/1971 Zurheide et al. ............ 414/626
4,531,647 A * 7/1985 Higuchi et al. ............. 212/274
5,133,465 A * 7/1992 Kalan ......................... 212/285
5,765,703 A * 6/1998 Shiwaku .................... 212/274
5,803,278 A * 9/1998 Shiwaku .................... 212/274
5,806,696 A * 9/1998 Hytonen .................... 212/270
6,760,644 B2 * 7/2004 Canaday et al. ............ 700/245

(Continued)

FOREIGN PATENT DOCUMENTS

JP    S58-63685 A    4/1983

(Continued)

OTHER PUBLICATIONS

Canny et al., A RISC approach to Sinsing and Manipulation, 1995, Internet, p. 1-12.*

(Continued)

*Primary Examiner*—Khoi Tran
*Assistant Examiner*—McDieunel Marc
(74) *Attorney, Agent, or Firm*—Westerman, Hattori, Daniels & Adrian, LLP.

(57) ABSTRACT

A height sensor 26 and an image recognizing section 28 are installed in a teaching unit 24; the height sensor 26 contacts a pin 30a on a load port 4 to detect the height position of the pin 30a and the image recognizing section 28 recognizes a pin 30c and thus its horizontal plane position. A platform 16 of an overhead travelling carriage 8 grips and lowers the teaching unit 24 toward the load port 4. The height sensor 26 then detects the height of the load port 4. Then, the teaching unit 24 is slightly raised. The horizontal plane position of the pin 30c is recognized and averaged over a time equal to at least the vibration period of the platform 16. As a result, the position of the load port can be accurately taught to the overhead travelling carriage 8 without preparations such as the installation of marks on the load port.

2 Claims, 5 Drawing Sheets

U.S. PATENT DOCUMENTS

| | | | |
|---|---|---|---|
| 7,185,774 B2 * | 3/2007 | Colgate et al. | 212/331 |
| 7,255,238 B2 * | 8/2007 | Ikeya | 212/331 |
| 7,461,753 B1 * | 12/2008 | Gatta et al. | 212/331 |
| 2004/0216439 A1 * | 11/2004 | Poulson et al. | 56/249 |
| 2008/0101892 A1 * | 5/2008 | Bonora et al. | 414/217 |

FOREIGN PATENT DOCUMENTS

| | | |
|---|---|---|
| JP | 2000-072378 A | 3/2000 |
| JP | 2001-071288 A | 3/2001 |
| JP | 2003-192269 A | 7/2003 |
| JP | 3479969 | 10/2003 |
| JP | 2004-030445 A | 1/2004 |
| JP | 2004-050306 A | 2/2004 |
| JP | 2005-170544 A | 6/2005 |

OTHER PUBLICATIONS

Notification of Reason for Refusal dated Jul. 23, 2007, issued in corresponding Japanese Patent Application No. 2005-008627.

* cited by examiner

OVERHEAD TRAVELLING CARRIAGE SYSTEM

FIELD OF THE INVENTION

The present invention relates to an overhead travelling carriage system, and in particular, to teaching of the height or horizontal position of a load port to an overhead travelling carriage.

BACKGROUND OF THE INVENTION

In overhead travelling carriage systems, load ports are provided at processing devices for semiconductors or liquid crystal displays so that articles can be transferred between a platform of an overhead travelling carriage and the load ports. Of course, the load ports may be provided at positions different from those of the processing devices. Data on articles at load ports must be taught to the overhead travelling-carriage. Thus, the inventors have proposed a system in which teaching is carried out by allowing a platform of an overhead travelling carriage to grip a teaching unit comprising a touch panel and providing each load port with a mark that gets into touch with the touch panel, for teaching to the overhead travelling carriage (The Japanese Patent No. 3479969). In this case, the platform lowers from the overhead travelling carriage toward the load port and the mark gets into touch with the touch panel, and then, on the basis of the height at which the mark has touched the touch panel, the height of the load port is taught to the overhead travelling carriage. On the basis of the position at which the mark has touched the touch panel, the horizontal plane position of the load port is taught to the overhead travelling carriage.

SUMMARY OF THE INVENTION

It is a basic object of the present invention to enable the position of a load port to be taught to an overhead travelling carriage without the need to install marks or the like on the load port. It is an additional object of the aspect of the invention set forth in claims 2 and 3 to enable the horizontal plane position of the load port to be more accurately determined by avoiding the adverse effect of vibration of a platform.

The present invention provides an overhead travelling carriage system in which a teaching unit supported by a platform of an overhead travelling carriage is lowered toward a load port to teach a position of the load port to the overhead travelling carriage, the overhead travelling carriage system being characterized in that a bottom portion of the teaching unit is provided with a height sensor that uses a pin on the load port to determine a height position of the load port and a horizontal plane position sensor that determines a horizontal plane position of the pin on the load port.

The height sensor may utilize magnetic coupling to the pin or a variation in capacitance to detect the pin in a non-contact manner. However, such a height sensor is less simple than one that comes into contact with the pin on the load port to determine the height position. However, such a contact type height sensor, the friction between the pin and the height sensor may cause the platform to be stopped at a position offset from the one immediately below the overhead travelling carriage main body. This reduces the accuracy with which the horizontal plane position is detected. Thus, preferably, when the height sensor comes into contact with the pin, the platform is raised to break the contact between the teaching unit and the load port. Then, the horizontal plane position sensor determines the horizontal plane position of the pin.

Particularly preferably, the horizontal plane position sensor determines the position of the pin on the load port a plurality of times during a time equal to at least a vibration period of the platform to compile a statistic on the horizontal plane positions determined to determine the horizontal plane position of the load port.

The present invention carries out teaching utilizing the pins originally provided on the load port to position articles. This simplifies preparations for teaching at the load port.

In the aspect of the present invention set forth in claim 2, when the height sensor comes into contact with the pin, the platform is raised. The horizontal plane position of the pin is then determined. This avoids measuring the horizontal plane position while the teaching unit is inclined as a result of the contact between the height sensor and the pin.

In the aspect of the present invention set forth in claim 3, a statistic is complied on measurements of the horizontal plane position sensor over a time equal to at least the vibration period of the platform. This makes it possible to prevent a biased position from being measured as a result of horizontal vibration of the platform.

DETAILED DESCRIPTION OF THE PREFERRED EMBODIMENTS

Figure 1:
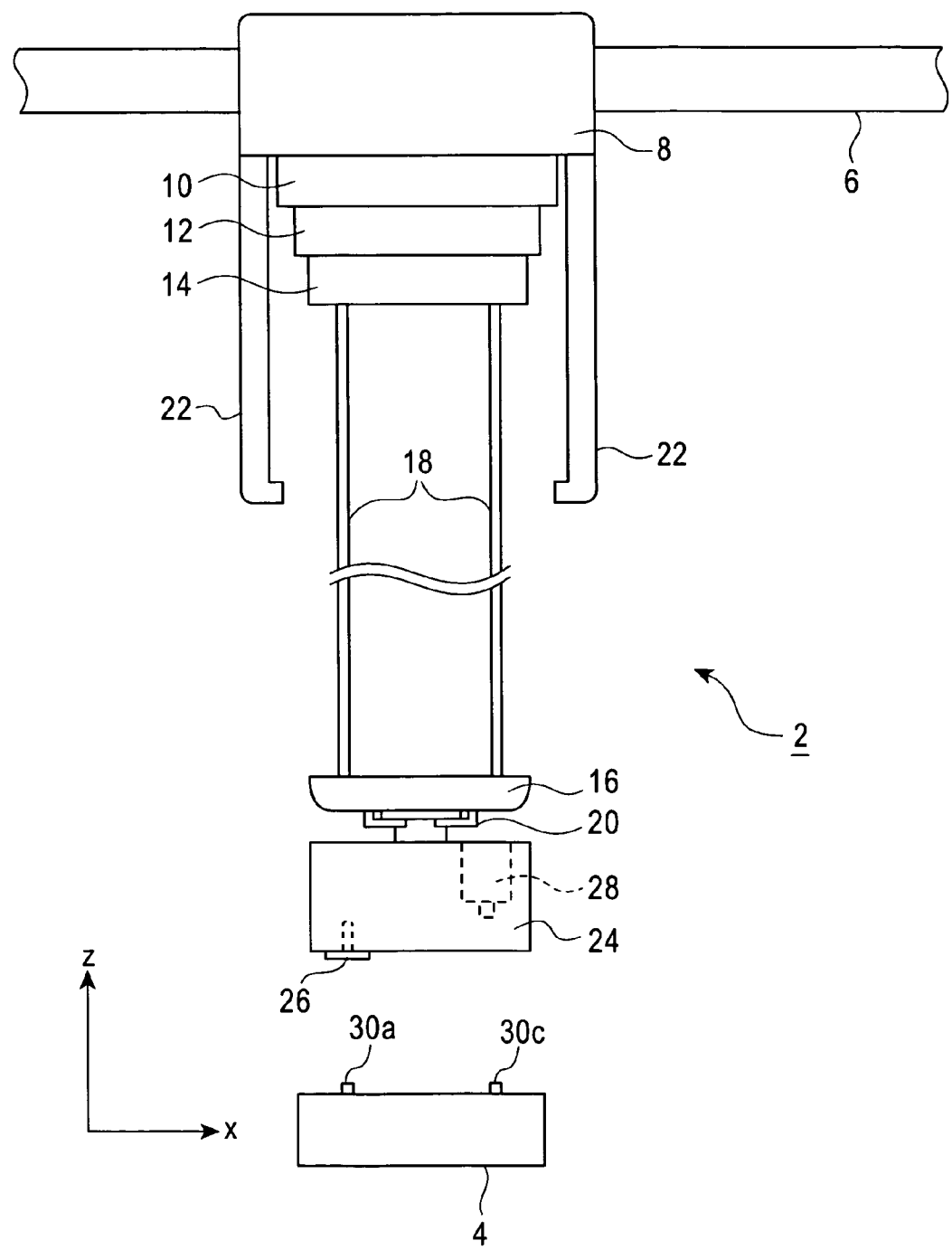
FIG. 1 is a side view showing an overhead travelling carriage performing a teaching operation in corporation with a load port according to an embodiment of the present invention.

The optimum embodiment for carrying out the present invention will be shown below.

FIGS. 1 to 5 show an overhead travelling carriage system in accordance with an embodiment of the present invention. In these figures, 4 is a load port. 6 is a running rail provided above a floor surface, for example, on the ceiling of a clean room. 8 is an overhead travelling carriage running along the running rail 6. The load port 4 is provided where the overhead travelling carriage 8 can deliver and receive an article to and from a processing device or another overhead travelling carriage 8.

The structure of the overhead travelling carriage 8 will be described. 10 is a lateral drive that moves devices ranging from a θ drive 12 to a platform 16 in a horizontal plane in a direction normal to the running rail 6. The θ drive 12 rotatively moves a rise and fall driving section 14 and the platform 16 in the horizontal plane. The rise and fall driving section 14 raises and lowers the platform 16 by winding and feeding a belt 18. An appropriate hanging member such as a wire or a rope may be used instead of the belt. A chuck 20 is provided on a bottom surface of the platform 16 so that it can grip a conveyed article. Vacuum suction may be used instead of the chuck. Further, for example, fall device covers 22, 22 are provided in the front and rear of the overhead travelling carriage 8. A pawl (not shown in the drawing) is moved forward and backward to prevent the conveyed article from falling.

24 is a teaching unit gripped by the chuck 20 on the platform 16. A height sensor 26 and for example, a pair of image recognizing section 28 are provided at the bottom of the teaching unit 24. The load port 4 has, for example, three pins 30a ~30c. These pins 30a ~30c are members originally provided on the load port 4 to position articles such as semiconductor cassettes.

Indications of directions in the embodiment are as follows. x is the direction in which the overhead travelling carriage 8 runs on the running rail 6. z is a height direction. y is a direction normal to the running rail 6 in the horizontal plane. The y direction may be referred to as a lateral direction. An inclination from an x-axis or a y-axis in the horizontal plane is referred to as an angle θ.

Figure 2:
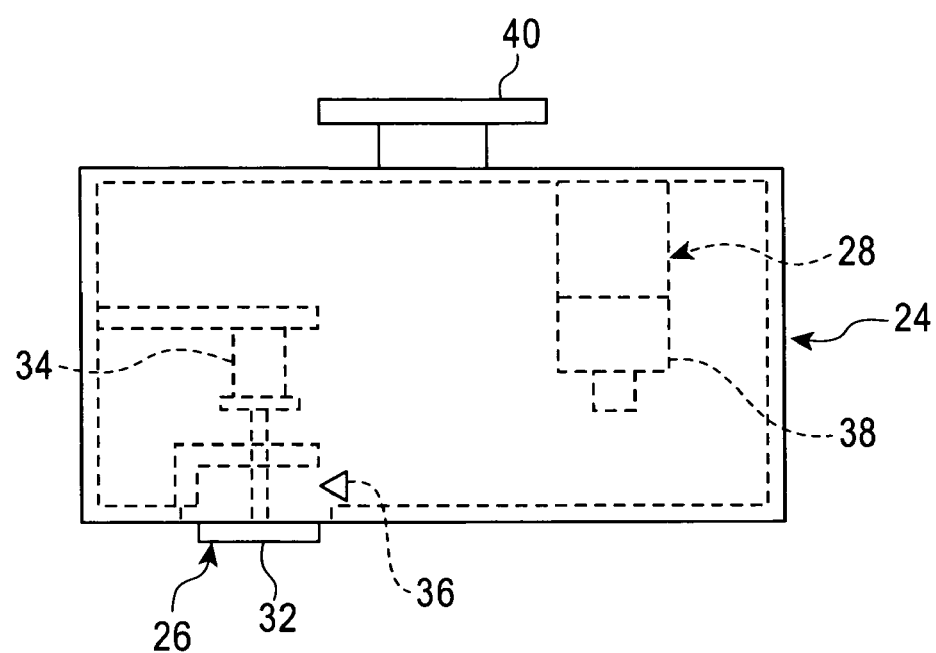
FIG. 2 is a side view of a teaching unit used in the embodiment of the present invention.

FIG. 2 shows the structure of the teaching unit 24. In the height sensor 26, a contact plate 32 is urged downward by a spring 34 or the like. A sensor 36 monitors vertical movement of the contact plate 32. When a pin 30a comes into contact with the contact plate 32, the spring 34 is compressed to raise the contact plate 32. This is detected by the sensor 36. The amount of the already fed part of the belt 18 measured when the sensor 36 detects the rise of the contact plate 32 corresponds to the height position of the load port 4 as viewed from the overhead travelling carriage 8.

Figure 3:
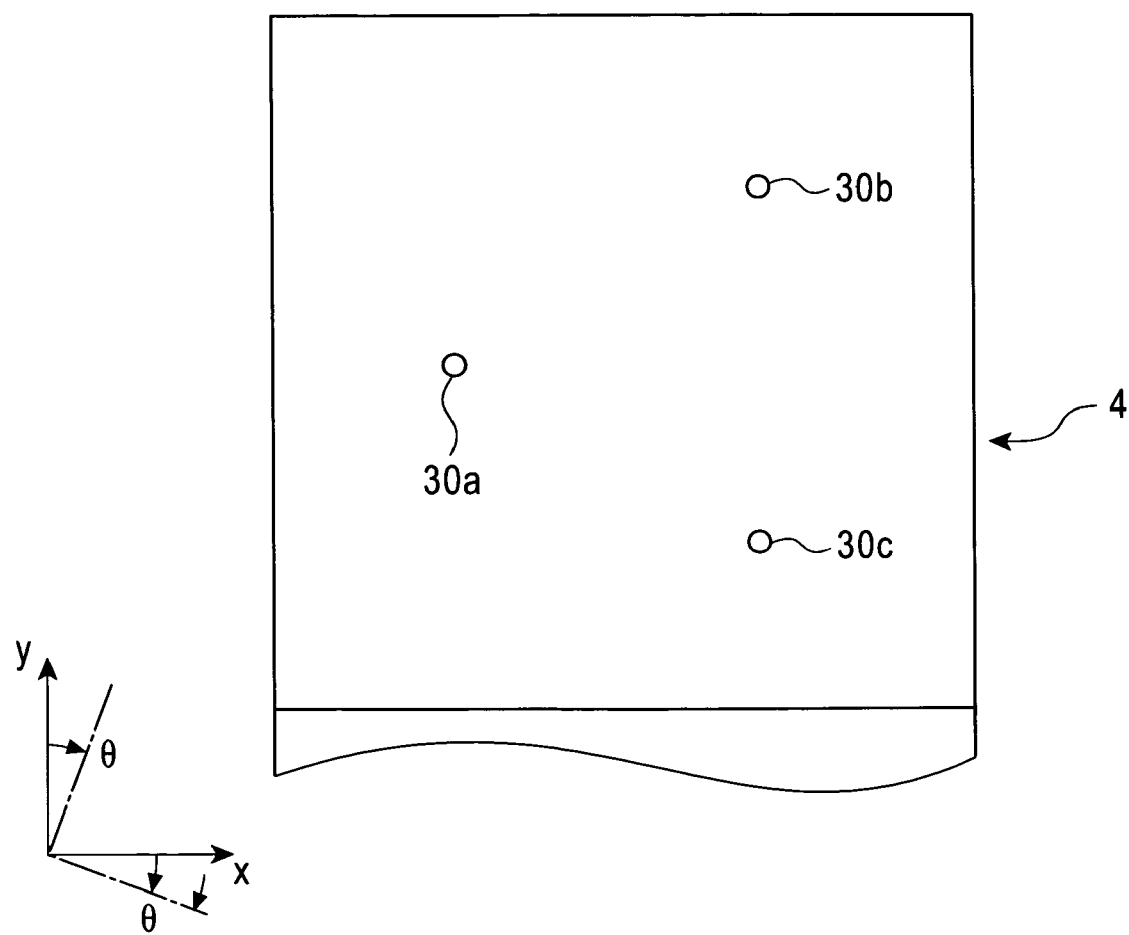
FIG. 3 is a plan view of the load port.

The image recognizing sections 28 are provided at the respective positions corresponding to two pins 30b, 30c in FIG. 3. Each of the image recognizing sections 28 comprises image pickup means such as a CCD camera 38. 40 is a flange plate provided at the top of the teaching unit 24. The chuck of the platform grips a bottom portion of the flange plate to raise or lower the teaching unit 24.

FIG. 3 shows the arrangement of the pins 30a ~30c on the load port 4, and the pins 30a ~30c are arranged in the form of, for example, an equilateral triangle. The pins 30a ~30c are fitted into a recess formed at the bottom of an article such as a semiconductor cassette, to guide the article. The number and positions of the pins 30a ~30c are arbitrary.

Figure 4:
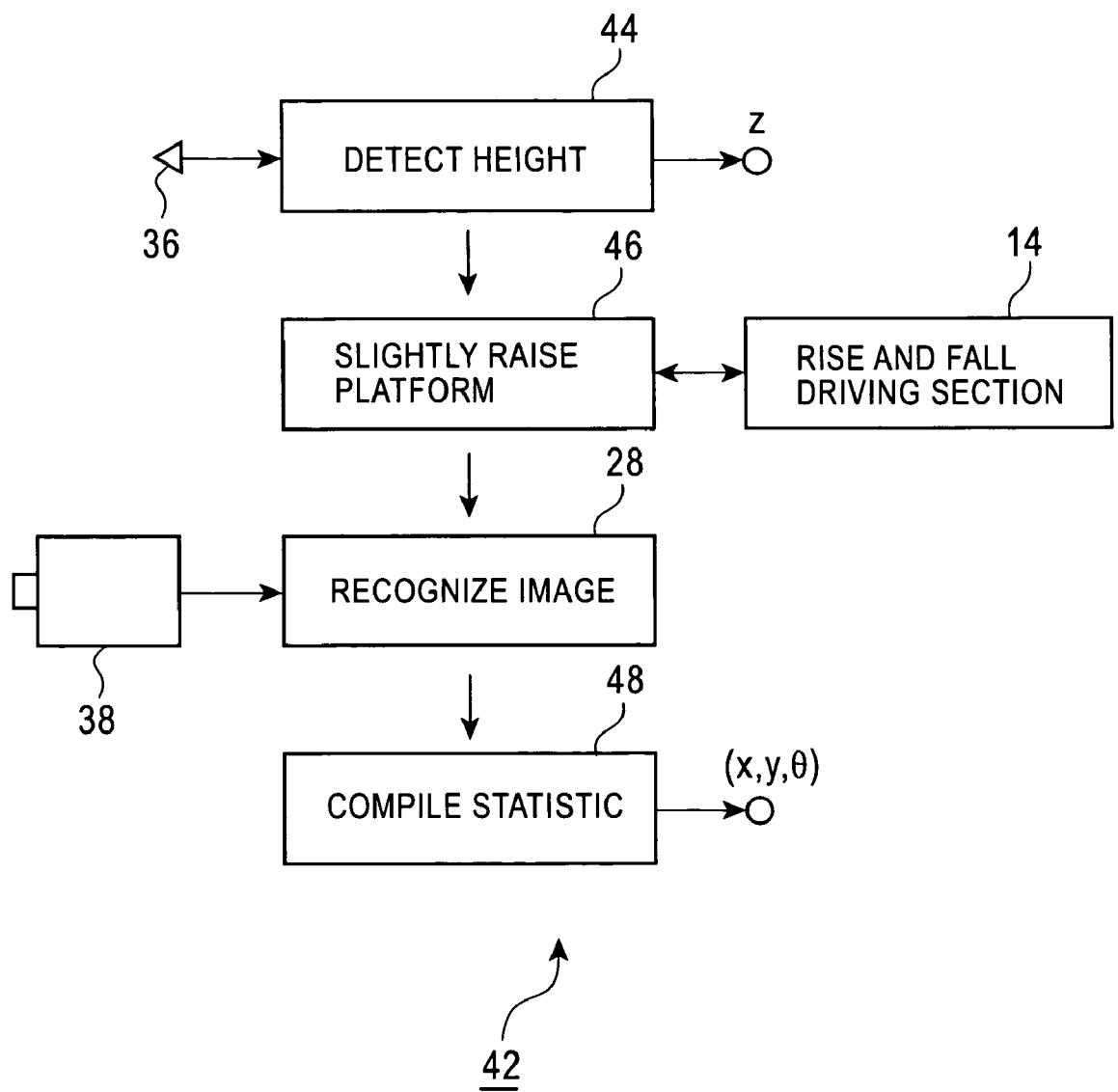
FIG. 4 is a block diagram of a section that processes teaching data according to the embodiment of the present invention.
Figure 5:
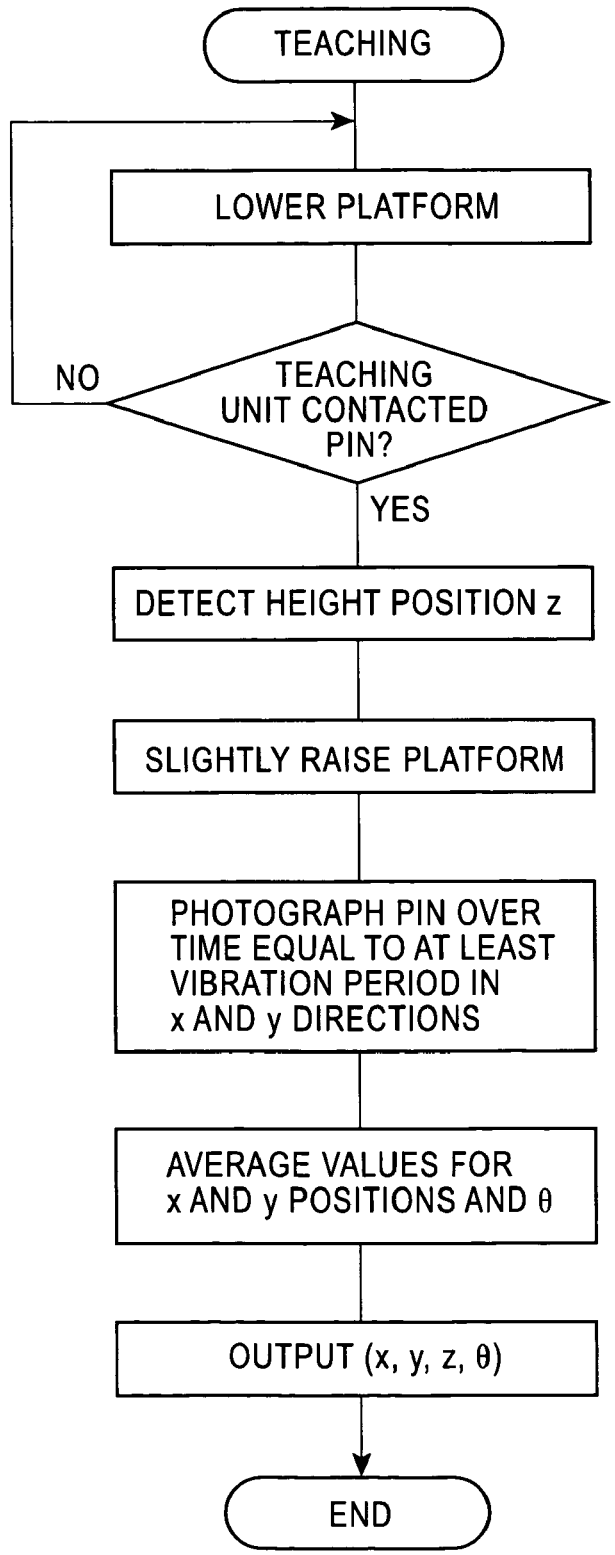
FIG. 5 is a flowchart showing a teaching algorithm in accordance with the embodiment of the present invention.

A processing section 42 in FIG. 4 processes data from the height sensor 26 and CCD camera 38. The processing section 42 may be provided in the teaching unit 24 or the overhead travelling carriage 8. In an extreme case, the processing section 42 may be provided in a controller for the whole overhead travelling carriage system which manages a plurality of overhead travelling carriages 8. A height detecting section 44 detects the height of the load port 4 on the basis of the amount of the already fed part of the belt measured when the sensor 36 detects the rise of the contact plate 32. The thus determined height is denoted as z.

A signal is input to a slight raise requesting section 46, the signal indicating that the sensor 36 has detected the rise of the contact plate 32. The slight raise requesting section 46 requests the rise and fall driving section 14 of the overhead travelling carriage 8 to raise the platform 16 slightly, for example, about 1 to 20 mm. When the rise and fall driving section 14 slightly raises the platform 16, the image recognizing sections 28 detect the positions of the two pins on the basis of data from the pair of CCD cameras 38. For example, if it is possible to determine how far the pin is located offset from the center of visual field of the pair of CCD cameras 38 in the x and y directions, the positions of the load port 4 in the x and y directions with respect to the teaching unit 24 can be determined on the basis of the average of the offset amounts obtained. Further, the angle θ between the load port 4 and the teaching unit 24 can be determined on the basis of the inclination of the line joining the two pins recognized by the pair of CCD cameras 38.

The teaching unit 24 is hung using the belt, together with the platform 16. The teaching unit 24 is thus vibrated in the x and y directions. The period of the vibration is, for example, at most 1 second. Thus, the CCD cameras 38 are used to determine the horizontal plane positions of the paired pins a plurality of times over a time equal to at least the vibration period. A statistic compiling section 48, for example, averages the plurality of horizontal plane positions thus determined. The statistic compiling section 48 outputs the x and y coordinates and angle θ of the load port 4. The above average may be a simple average or a geometrical average. Instead of the averaging, a process may be executed for creating histograms for the horizontal plane position in the x and y directions and using the most frequent values. Alternatively, a median or the like may be used such as the 50-th of 99 values obtained by measuring the horizontal plane position.

In the embodiment, the pair of CCD cameras 38 is used. However, one CCD camera 38 may be used to recognize the position of two, three, or any other number of pins. Further, a sensor different from the CCD camera 38 may be used to detect the horizontal plane position. The position of the pin can be determined by, for example, arranging a plurality of coils in ring form, lowering the coils to above the pin on the load port 4, and determining which of the coils is most strongly magnetically coupled to the pin. If the overhead travelling carriage 8 does not comprise the θ drive 12, then for example, the system may determine whether or not the angle θ is within an allowable range. If the angle θ is beyond the allowable range, the direction in which the load port 4 is mounted may be adjusted.

The embodiment exerts the following effects.

(1) The load port only uses the pins originally provided on the load port. This eliminates the need for preparations for the load port.

(2) The horizontal plane position of the pin is measured with the teaching unit maintained above the pin. This prevents the teaching unit from being stopped at a position offset from the one immediately below the overhead travelling carriage as a result of the friction between the teaching unit and the pin.

(3) The horizontal plane position is measured over a time equal to at least the vibration period of the platform to compile a statistic. This avoids the adverse effect of vibration of the platform.

(4) Thus, the position of the load port with respect to the overhead travelling carriage can be determined easily and accurately.

The invention claimed is:

1. An overhead travelling carriage system, comprising:

an overhead travelling carriage having a platform, a teaching unit supported by said platform, including a height sensor and a horizontal plane position sensor on a bottom portion of said teaching unit, said teaching unit is lowered toward a load port to teach a position of the load port to the overhead travelling carriage, said height sensor uses a pin on the load port to determine a height position of the load port, said horizontal plane position sensor determines a horizontal plane position of the pin on the load port, the height sensor determines the height position of the load port by coming into contact with the pin on the load port, and when the height sensor contacts the pin, the platform is raised to cause the teaching unit to break contact with the load port before the horizontal plane position sensor determines the horizontal plane position of the pin.

2. An overhead travelling carriage system according to claim 1, the horizontal plane position sensor determines the position of the pin on the load port a plurality of times during a time equal to at least a vibration period of the platform to compile a statistic on the horizontal plane positions determined to determine the horizontal plane position of the load port.

* * * * *